(12) United States Patent
Lanham

(10) Patent No.: US 9,934,709 B2
(45) Date of Patent: Apr. 3, 2018

(54) VIDEO DISPLAY SCREEN SYSTEMS AND METHODS FOR DISPLAYING INFORMATION

(76) Inventor: Randall James Lanham, Coto de Caza, CA (US)

( * ) Notice: Subject to any disclaimer, the term of this patent is extended or adjusted under 35 U.S.C. 154(b) by 0 days.

(21) Appl. No.: 11/833,817

(22) Filed: Aug. 3, 2007

(65) Prior Publication Data

US 2008/0030427 A1 Feb. 7, 2008

Related U.S. Application Data

(60) Provisional application No. 60/835,395, filed on Aug. 3, 2006, provisional application No. 60/848,970, filed on Oct. 3, 2006.

(51) Int. Cl.
| | | |
|---|---|---|
| *G09F 21/04* | (2006.01) | |
| *G09F 9/30* | (2006.01) | |
| *G09F 21/06* | (2006.01) | |

(52) U.S. Cl.
CPC ............. *G09F 21/04* (2013.01); *G09F 9/30* (2013.01); *G09F 21/048* (2013.01); *G09F 21/06* (2013.01)

(58) Field of Classification Search
CPC ............................. G09F 21/04; G09F 21/048
USPC .......................................................... 345/2.3
See application file for complete search history.

(56) References Cited

U.S. PATENT DOCUMENTS

| | | | | |
|---|---|---|---|---|
| 3,761,890 A | * | 9/1973 | Fritts et al. ................... | 340/473 |
| 5,438,780 A | * | 8/1995 | Winner ............................ | 40/514 |
| 5,825,281 A | * | 10/1998 | McCreary ............ | B60Q 1/2611 |
| | | | | 340/425.5 |
| 5,897,158 A | * | 4/1999 | Henke et al. ................ | 296/24.3 |
| 6,060,993 A | * | 5/2000 | Cohen ........................ | 340/691.6 |
| 6,282,822 B1 | * | 9/2001 | Rinzler et al. .................. | 40/590 |
| 6,577,334 B1 | * | 6/2003 | Kawai et al. ................. | 348/148 |
| 6,812,851 B1 | * | 11/2004 | Dukach et al. ............ | 340/815.4 |
| 6,898,517 B1 | * | 5/2005 | Froeberg ....................... | 701/207 |
| 6,915,209 B1 | * | 7/2005 | Spann .......................... | 701/213 |
| 7,133,002 B2 | | 11/2006 | Langlois | |
| 7,154,383 B2 | * | 12/2006 | Berquist .................... | 340/425.5 |

(Continued)

FOREIGN PATENT DOCUMENTS

| | | |
|---|---|---|
| EP | 0 344 125 A1 | 11/1989 |
| EP | 0 537 882 A1 | 4/1993 |

(Continued)

OTHER PUBLICATIONS

International Search Authority Partial Search Report and Communication dated Feb. 21, 2008.

(Continued)

*Primary Examiner* — Viet Pham
(74) *Attorney, Agent, or Firm* — David Duckworth

(57) ABSTRACT

Various embodiments of the present invention relate to systems and methods for displaying information in a real-time updateable form. In one embodiment, the present invention can comprise a system comprising a vehicle, a video display attached to the vehicle, a wireless data transfer device capable of receiving data transmissions, an operational sensor device capable of detecting changes in the operation of the vehicle, a controller that receives signals from at least one source and transmits signals to video display, and a plurality of power sources where at least one of the power sources is independent of the power supply of the vehicle.

3 Claims, 15 Drawing Sheets

(56) References Cited

U.S. PATENT DOCUMENTS

| | | | |
|---|---|---|---|
| 7,449,998 B1* | 11/2008 | Au et al. | 340/468 |
| 2004/0145462 A1* | 7/2004 | Ambrose | 340/441 |
| 2007/0209251 A1* | 9/2007 | Zheng et al. | 40/471 |

FOREIGN PATENT DOCUMENTS

| | | | | |
|---|---|---|---|---|
| GB | 2 391 102 A | | 1/2004 | |
| JP | 04 052821 A | | 2/1992 | |
| WO | WO 2004070690 A1 | * | 8/2004 | G09F 21/04 |

OTHER PUBLICATIONS

PCT Search Report and Written Opinion of the International Searching Authority dated Apr. 10, 2008 for International Application No. PCT/US2007/017408.

* cited by examiner

VIDEO DISPLAY SCREEN SYSTEMS AND METHODS FOR DISPLAYING INFORMATION

CROSS-REFERENCE TO RELATED APPLICATIONS

The present application claims priority under 35 U.S.C. § 119(e) from U.S. Provisional Patent Application No. 60/835,395, filed Aug. 3, 2006, and U.S. Provisional Patent Application No. 60/848,970, filed on Oct. 3, 2006, each of which is incorporated by reference herein in its entirety.

FIELD OF THE INVENTION

The present invention relates to systems and methods for the placement and powering of video screens for the purpose of distributing real time information. Embodiments of the present invention relate to the relaying of advertisement information, operational information, and other information by utilizing a satellite or other wireless communication devices and/or and local informational supplying devices.

BACKGROUND

Companies rely on advertising to generate millions of dollars in business from independent consumers each year. Much time and money is invested in advertisements in multiple mediums. Companies often employ a variety of advertising techniques, such as electronic (television, radio, and the internet) as well as still images (billboards or print media) to disseminate information about their products to potential consumers. In order to be successful, companies must place their information in locations where it will be viewed by the largest number of potential consumers. In order to be successful in the advertising business, companies must develop strategies to reach the maximum amount of potential customers with each type of advertisement.

Many companies place their ads on electronic media to be viewed, perceived, or noticed by customers. An example is radio advertisements that air throughout the day on commercial radio stations. This strategy may not be very effective as many people switch to a different radio station when commercials begin to air. In addition, as more Americans begin to utilize Internet and satellite radio, the power of radio advertisement will further decline.

Many companies also utilize television advertisements to increase awareness about their products. This strategy, while effective, can present a cost prohibitive barrier to many smaller businesses. Companies must not only pay for the airtime on the network, but must also pay to create the commercial. The companies must also investigate the best time to air their commercial so it will reach the maximum number of viewers. Network airtime during very popular shows can be very expensive for a short time slot. In addition, with the advent of technologies such as TiVo® (TiVo, Alviso, Calif.) more people pre-record television shows and subsequently skip the commercials.

Recently, companies have begun to advertise their products on the World Wide Web. Advertisers can purchase space on popular websites to display "banner ads". Consumers can click on the ad to be directed to the company's website or a retailer of the product. Many advertisers also employ "pop-up" ads that open a new browser window when an individual visits a particular website. Some consumers have found these advertisements to be annoying or intrusive and have employed pop-up blockers to block the advertisements or have switched to Internet service providers that do not use advertisements.

In addition to the various electronic advertising strategies, companies also employ still or print advertisements. Companies may employ a variety of media for placement of their advertisements. Companies will often place their advertisements in newspapers or magazines. However, fewer consumers are obtaining their news from print sources as more and more people turn to electronic news sources. Potential consumers may not see the advertisements.

As individuals have become more and more mobile, companies have turned to the use of large print advertisements displayed in retail areas or along heavily traveled highways. Retailers will often advertise their products within a shopping area, such as a mall, to attract customers to their stores. However, many businesses rely on advertising at locations remote from their place of business. Often these retailers will place advertisements along major highways in an attempt to induce customers to visit their location off of the highway. Technology has advanced within the last decade to allow for rotating billboards. These displays allow for more than one company to place their advertisement on a single billboard, and the image rotates at a pre-determined time interval. Some companies have also begun to employ electronic billboards that display various ads on LED, LCD, or other types of display screens. Rotating and electronic billboards, while more effective than single image billboards, cannot be changed in real time with changes in the area.

In addition to billboards or other signage in retail areas, companies may also use their own delivery trucks to advertise their products while they are in transit. Still other retailers may place their information on independently owned vehicles simply for advertising purposes. Customers can view the vehicles while traveling on the highway, and this viewing can increase brand recognition. Currently, vehicles can be painted with the advertisement or fitted with a billboard advertisement on the side of the vehicle. While many consumers may view the vehicle while traveling on the roadway, the signage is difficult to change if a different message is desired.

Thus a new way of delivering advertising content, as well as other informational content, to consumers and the general public is needed.

SUMMARY OF THE INVENTION

The present invention provides systems and methods for mobile and stationary information display.

In an embodiment, the present invention can provide a video display that can be attached onto vehicles to display advertisements and other information in real time. In some embodiments, the other information comprises operational information of the vehicle. The video display may comprise a display screen or display screens. The screens may comprise an LCD, LED, plasma, projection, CRT, or optical fibers screen.

In an embodiment of the present invention, a video display can be mounted on a vehicle. The video display may be affixed in a variety of ways to the vehicle, such that information being displayed may be viewed in the environment around the vehicle. In one embodiment, the display may be affixed to a trailer behind a vehicle. In some embodiments, the video display can be capable of changing the displayed information in response to vehicle operation indicators.

In one embodiment, the present invention may provide a system comprising a vehicle with a video display, attached to the vehicle, that is capable of displaying information and updateable in real-time. The system can include a wireless data transfer device capable of receiving data transmissions from a plurality of sources. The system can include an operational sensor device that can detect changes in the operation of the vehicle. A controller can be included within the system to receive signals from at least one source and to transmit signals to the video display. The system may be powered by a plurality of power sources. In some embodiments, at least one power source can be independent of the power supply of the vehicle.

In some embodiments, the system may comprise a video display that can be attached to a supporting frame. The video display and supporting frame can be repositioned to provide an unobstructed entry and exit into the vehicle. In a further embodiment, a vehicle may contain a retractable static advertisement. When the static advertisement is in the retracted position, at least one projector may project an image upon the blank screen. The retractor device and at least one projector can have a sensor to trigger the operation of the retractor and projector.

In another embodiment, the present invention may provide a method for displaying a plurality of information comprising transmitting the position of a video display system which may allow the displayed information to be specific to the location of the system. The method can include a controller that receives signals or data from a wireless data transmitter and/or receives signals or data from a operational sensor device. The method provides that the controller can process the received signals and data to generate a priority ranking of the signals. The method of the present invention can select specific information to display on the video display and output the selected information to the video display for displaying the selected information.

In a further embodiment, the present invention provides a system comprising a video display attached to a support structure with a retractor device capable of retracting and extending a screen. The screen can provide a static means to display information in the extended position. When in the retracted position, the screen can provide a video display. The system can include a wireless data transfer device capable of receiving data transmissions, a controller that can receive signals from at least one source and that can transmit signals to the video display, and at least one light sensor. The system can be powered by a plurality of power sources.

These and other embodiments of the present invention are described in greater detail in the Detailed Description which follows.

DETAILED DESCRIPTION

Figure 1:
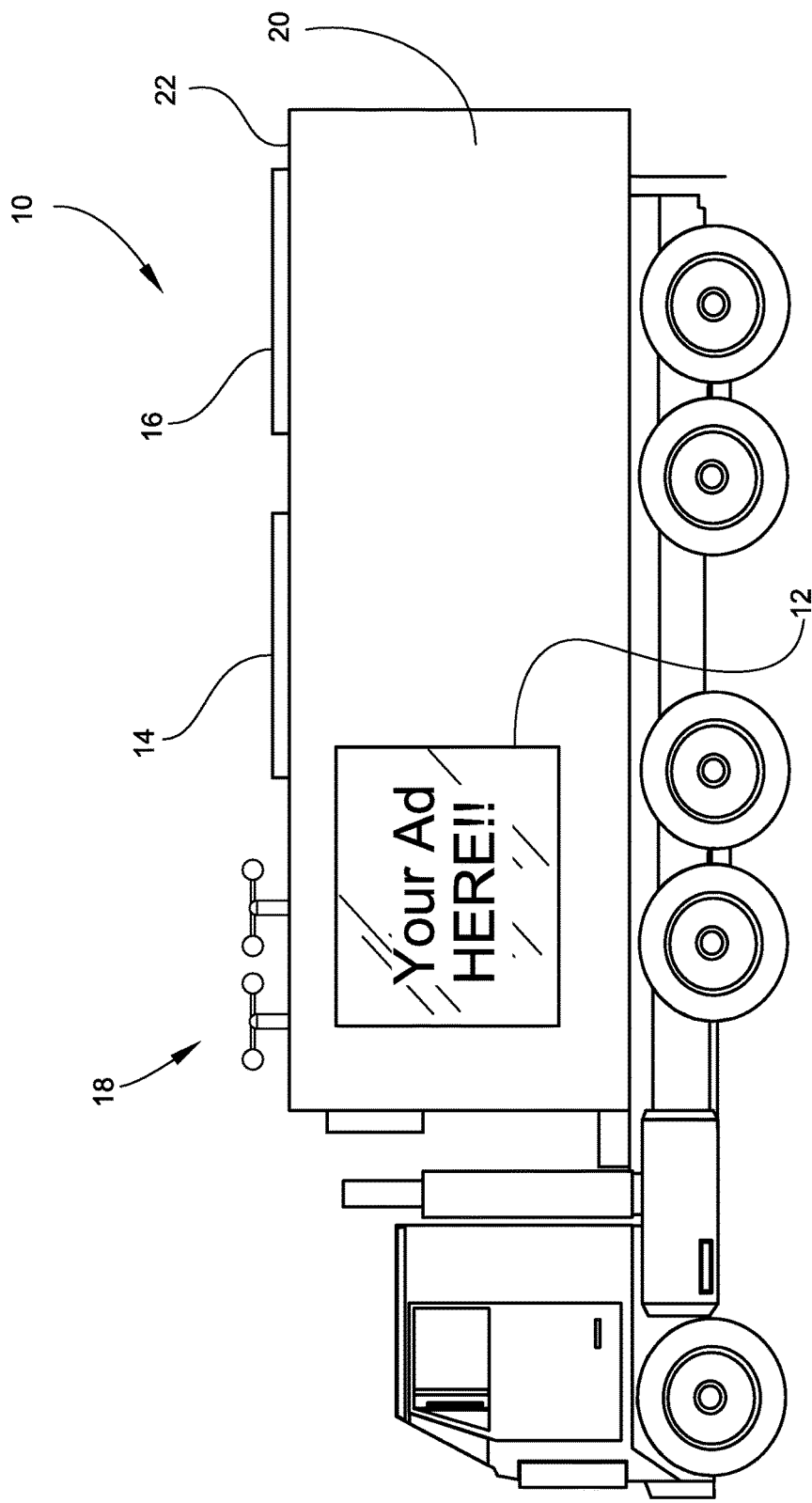
FIG. 1 is a side view of a vehicle fitted with a video display in an embodiment of the present invention.

By way of example, in order to provide an understanding of the invention, embodiments of the present invention are described with reference to a tractor trailer vehicle and a stationary billboard. It should be appreciated by the remainder of the disclosure herein, that the present invention is not limited to the embodiments described below but may comprise other embodiments for use with other vehicles, including, but not limited to, trucks, automobiles, motorcycles, boats, planes, barges, balloons, or similar vehicles designed for travel over land, air or water, as well as all-types of trailers in tow, or other stationary screens.

Advertising is a dynamic business that must change in response to changes in the social climate or pressures from the marketplace. Companies must continually update their advertisements to fit with the current trends or desires of consumers. Current methods require a significant time and monetary investment by the company to alter their advertisement. Thus, a faster, easier method to change advertisements is desirable.

As society becomes more technologically advanced, consumers have come to rely on real time and current information. The use of cell phones and mobile devices capable of internet access has exploded in the past decade as Americans desire to be in touch at all times. A technology that allows for real time dissemination of information along highways would present an advance to consumers who wish to remain connected and to receive real-time information. Vehicles, screens, or billboards equipped with a display according to embodiments of the present invention that display information in real time could provide the desired information to consumers.

Some advertising display systems may exist that provide for updateable information display; however, the conventional systems do not address the safety of individuals and drivers that view the display or advertisement. The conventional systems may create a moving safety hazard because a fellow driver's attention may be distracted by reviewing the advertisement. It is desirable for a system of displaying advertisements and other information in real time while taking into consideration the safety concerns of fellow drivers. Embodiments of the present invention may provide greater safety protection for the drivers and consumers. Embodiments of the present invention can enhance the safety of consumers that are reviewing the advertisements or other displayed information.

In one embodiment, the present invention provides a system comprising a vehicle; a video display attached to the vehicle wherein the video display can be positioned in a housing; a wireless data transfer device wherein the wireless data transfer device comprises a wireless receiver, the wireless receiver being capable of receiving data transmissions; an operational sensor device wherein the operational sensor device can detect changes in the operation of the vehicle; a controller wherein the controller receives signals from at least one source, the at least one source comprising the wireless data transfer device or the operational sensor device, and further wherein the controller can transmit signals to the video display; and a plurality of power sources wherein at least one of the power sources comprises a power source that is independent of the power supply of the vehicle. In some embodiments, the system may comprise a video display that can be attached to a supporting frame. The video display and supporting frame can be repositioned to provide an unobstructed entry and exit into the vehicle. In a further embodiment, a vehicle may contain a retractable static advertisement. When the static advertisement is in the retracted position, at least one projector may project an image upon the blank screen. The retractor device and at least one projector can have a sensor to trigger the operation of the retractor and projector.

In an embodiment of the present invention, a video display of varying thickness may be affixed onto vehicles, such as tractor-trailer trucks as shown in FIGS. 1-13. As found in FIGS. 1-13, the video display can be attached in using different techniques and in different positions. The display may be of different sizes depending on the information to be displayed and the type and size of location of placement on a vehicle, screen, or billboard. The thickness of the video display may vary. In an embodiment where the video display is affixed to the vehicle, it is preferable that the size and thickness of the display not impede safe operation of the vehicle. A representative, but not to be consider limited, thickness of a video display for mounting on a vehicle is about three inches. The possible types of video displays include, but are not limited to, LCDs, LEDs, plasma screens, projection screens, CRT screens, optical fiber screens, and other display screens. The video display may be powered by any number of different power sources, including, but not limited to solar, wind, or a rechargeable power source.

In some embodiments, a system of the present invention comprises a wireless data transfer device for receiving information transmitted by any of a plurality of transmitters, such as Bluetooth® technology (Bluetooth SIG, Inc., Bellevue, Wash.), satellites, cellular telephones, a wireless network, WiFi, internet, or intranet. Information received by the wireless data transfer device may be communicated to the display through the controller for displaying. The vehicle may also comprise a position locating device, such as a GPS system, to determine the location of the vehicle. The information can be sent over air waves to the wireless transfer device.

In another embodiment, information to be displayed is stored remotely from the system, for example on a computer system and/or hard disk. Information from the computer system and/or hard disk may be communicated to the system for displaying. In some embodiments, the information may be communicated over air waves. The hard disk/computer system may be updated to provide new information for system and the video display. In a further embodiment, a wireless receiver can be used to update the hard disk with new information.

In some embodiments, an operational sensor device can be used to detect changes in the vehicle operation indicators and change the information being displayed. An example, not to be considered limiting, of a vehicle operation indicator is the application of the brakes of a vehicle. In this non-limiting example, when the brakes are applied, the operational sensor device detects a stimulus (for example, the application of the brakes), transmits a signal to the controller, the controller processes the signal, and the controller transmits a signal to the video display to display some defined message that indicates the brakes are being applied. Other examples of vehicle operation indicators can include application of the accelerator, blinkers, direction indicator lamps, change of bearing, and other like indicators.

A video display of the present invention may vary in size depending on the size of the vehicle. Video displays must be of minimal width to be mounted on the side or back of a vehicle. Due to their considerable thickness and weight, video display screens may need to be reduced in width. The width of the video display may not impair the vision of the driver. In some embodiments, the width can be less than about three inches. In other embodiments, the width of the video display can allow the clearance of the back roll-up door. In some embodiments, video displays may be composed of a series of panels. In some embodiments the panel construction can be utilized so as to not impair the functioning of the roll-up back door of the truck.

Typical LCD screens are eight inches in width, potentially too large and heavy to be mounted on the side of a vehicle. In order to accommodate mounting on a vehicle, a LCD screen may be broken down into its component parts with only the screen being mounted on the side or back of the vehicle. It can be desirable to mount the other components of a display screen on other parts of the vehicle to prevent a weight imbalance created by mounting a heavy screen and component parts on the side or back of a vehicle.

In some embodiments, the video display may be attached to the rear of the truck and positioned on a supporting frame. In some embodiments, the supporting frame can comprise horizontal members and vertical members. The supporting frame can provide a structure in which the video displayed can be mounted.

In some embodiments, the frame can be attached to the rear of the vehicle The attachment device can comprises a hinge or other like device. In one embodiment, at least one hinge can be attached to the vehicle and the supporting frame. The hinge can allow the supporting frame and the video display to be swung open around the central axis of the hinge to a position that does not interfere with the loading and unloading of a vehicle. In some embodiments, the hinge can be swung open around the central axis of the hinge to about 90° from its closed position. In some embodiments, the hinge can be swung open around the central axis of the hinge to about 110° from its closed position.

In some embodiments, the hinge may be oriented vertically so that the supporting frame swings open to an orientation where the display screen of the video display remains substantially perpendicular to the ground. In other embodiments, the hinge may be oriented horizontally so that the supporting frame swings open where the display screen of the video display transitions to be substantially parallel to the ground. In some embodiments, the hinges oriented horizontally may be positioned on a top horizontal member. In other embodiments, the hinges oriented horizontally may be positioned on the top section of vertical members.

In some embodiments, when the hinge is oriented horizontally allowing the video display to be in a substantially parallel to the ground open position, the video display may be repositioned on the top of the vehicle. In this embodiment, the hinge provides about a 90° angle of rotation. When the supporting frame and video display are the open position, the supporting frame may be slid into a second frame comprising track bars.

In some embodiments, the video display can be displayed on the top of the vehicle. In some embodiments, the video display can attached to a rotating device. The rotating device is capable of rotating the video display over a range of angles. In some embodiments, the range of rotation can be 360°. In some embodiments, the range of rotation can be about 180°. In other embodiments, the range of rotation can be about 135°. In yet other embodiments, the range of rotation about 90°. In some embodiments the video display can be rotated automatically or according to a predetermined routine.

In other embodiments, the video display may be displayed on top of the vehicle in a stationary position. The video display may be flipped up so that the display screen can be visible from ground level. In some embodiments, a hinge or like device can be used to reposition the video display so that it may be viewed from ground level. In some embodiments, track bars into which a video display can be stored may be connected to the top of a vehicle via a hinge or other like device. By re-orienting the track bars by using the hinge, the video display can be displayed to individuals at the ground level. In yet other embodiments the track bars may be positioned on a rotating device that rotates the entire track bar structure. By rotating the entire track bar structure, the video display can be visible from a plurality of positions on the ground level.

One exemplary embodiment of the present invention can be found in FIG. 1. FIG. 1 illustrates an embodiment of a system of the present invention. Vehicle 10 has video display 12 attached to the side 20 of the vehicle's trailer. The video display 12 can be connected to a control box 14. Within the control box 14, among other devices, a controller, a wireless data transfer device, a power supply, and/or a position locating device can be located. The connection between the video display 12 and the control box 14 can be provided by wires, cables, and other connectors known to one of ordinary skill in the art. In some embodiments, the connecting wires may be mounted along the side of the vehicle, along the top of the vehicle, or along the back of the vehicle. In other embodiments, the connecting wires may be incorporated into the side 20. In some embodiments, wind turbines 18 and/or solar panels 16 may be used as a mechanism to generate power for the system. Although in the embodiment as shown, the control box is positioned on the top 22 of the trailer, it should be understood that other placement configurations are possible including, but not limited to, positions such as behind the cab of a tractor trailer, inside a trailer, or any other suitable locations.

Figure 2:
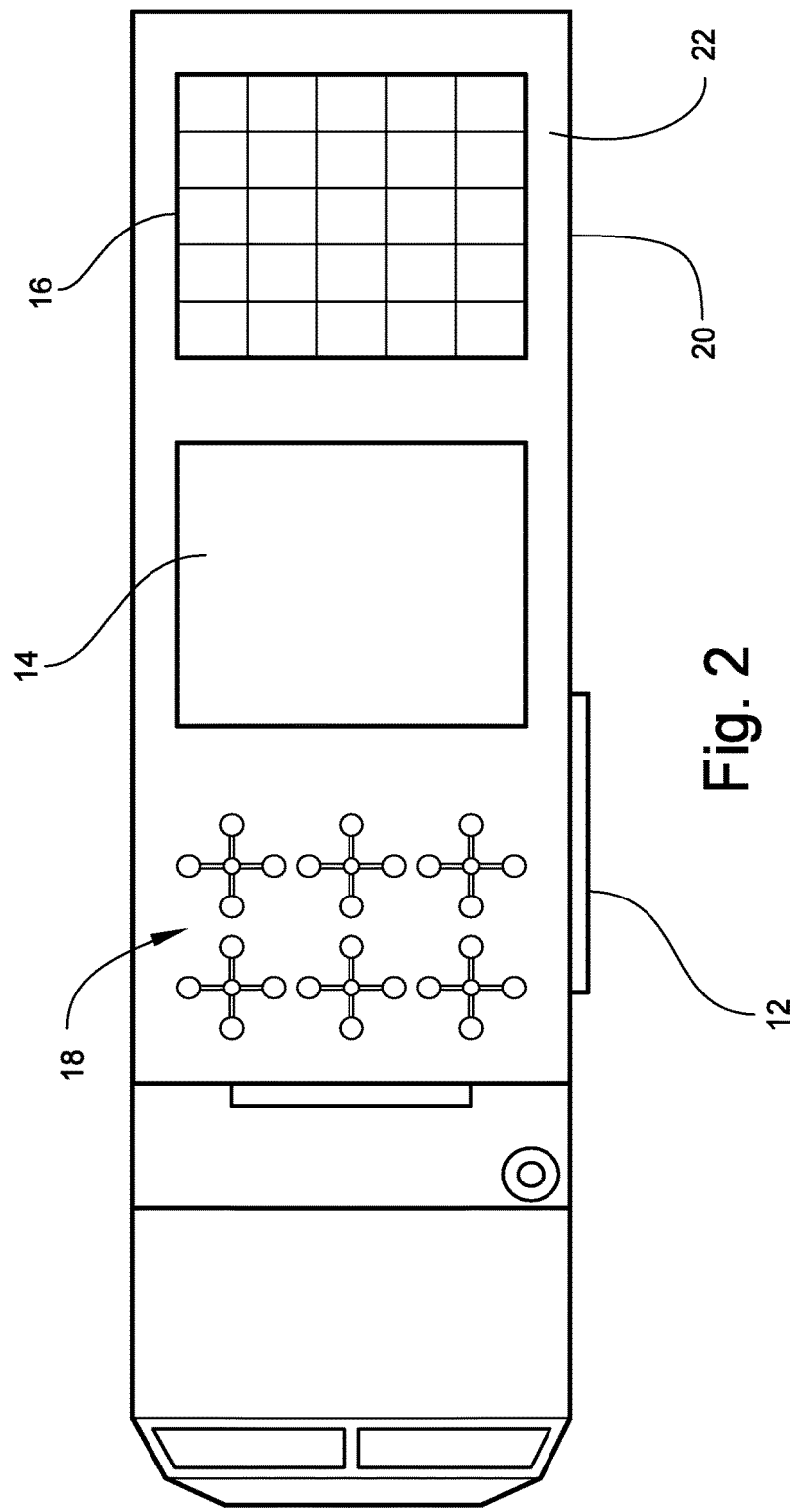
FIG. 2 is a top view of a vehicle fitted with a video display in an embodiment of the present invention.

FIG. 2 illustrates a top view of an embodiment of a vehicle with video display 12 mounted to the side 20 of the trailer. In the embodiment illustrated in FIG. 2, the control box 14 is positioned on top 22 of the trailer. The plurality of wind turbines 18 and the solar panel 16 can be utilized to generate power for the controller and video display to operate.

Figure 3:
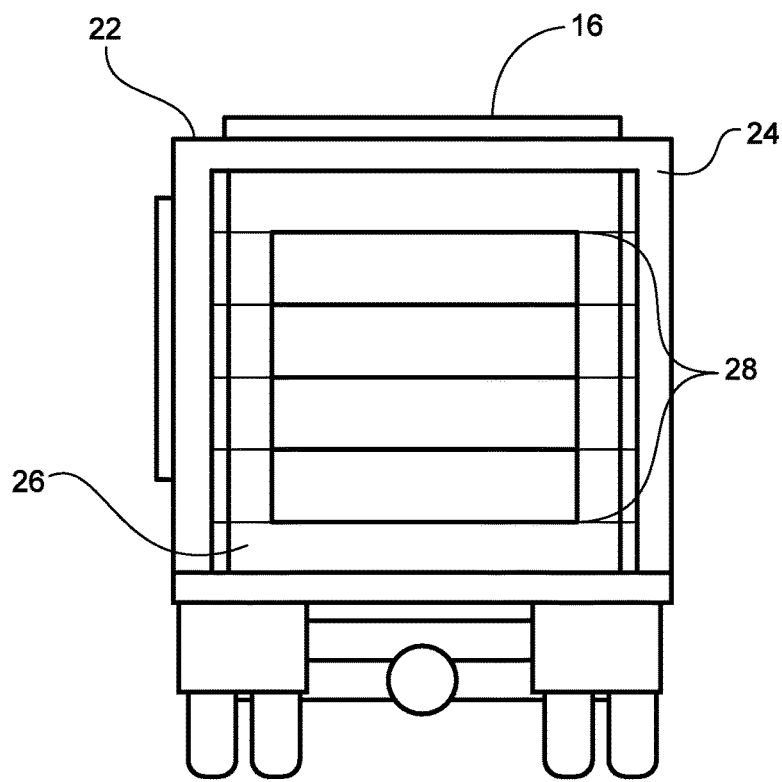
FIG. 3 is a back view of a vehicle fitted with a video display in an embodiment of the present invention.
Figure 4:
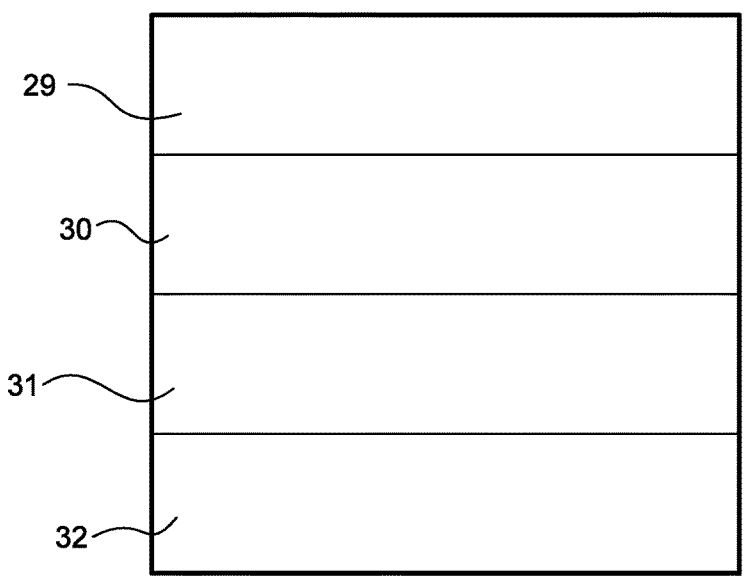
FIG. 4 is a front view of a video display comprised of a plurality of panels as found in an embodiment of the present invention.
Figure 5:
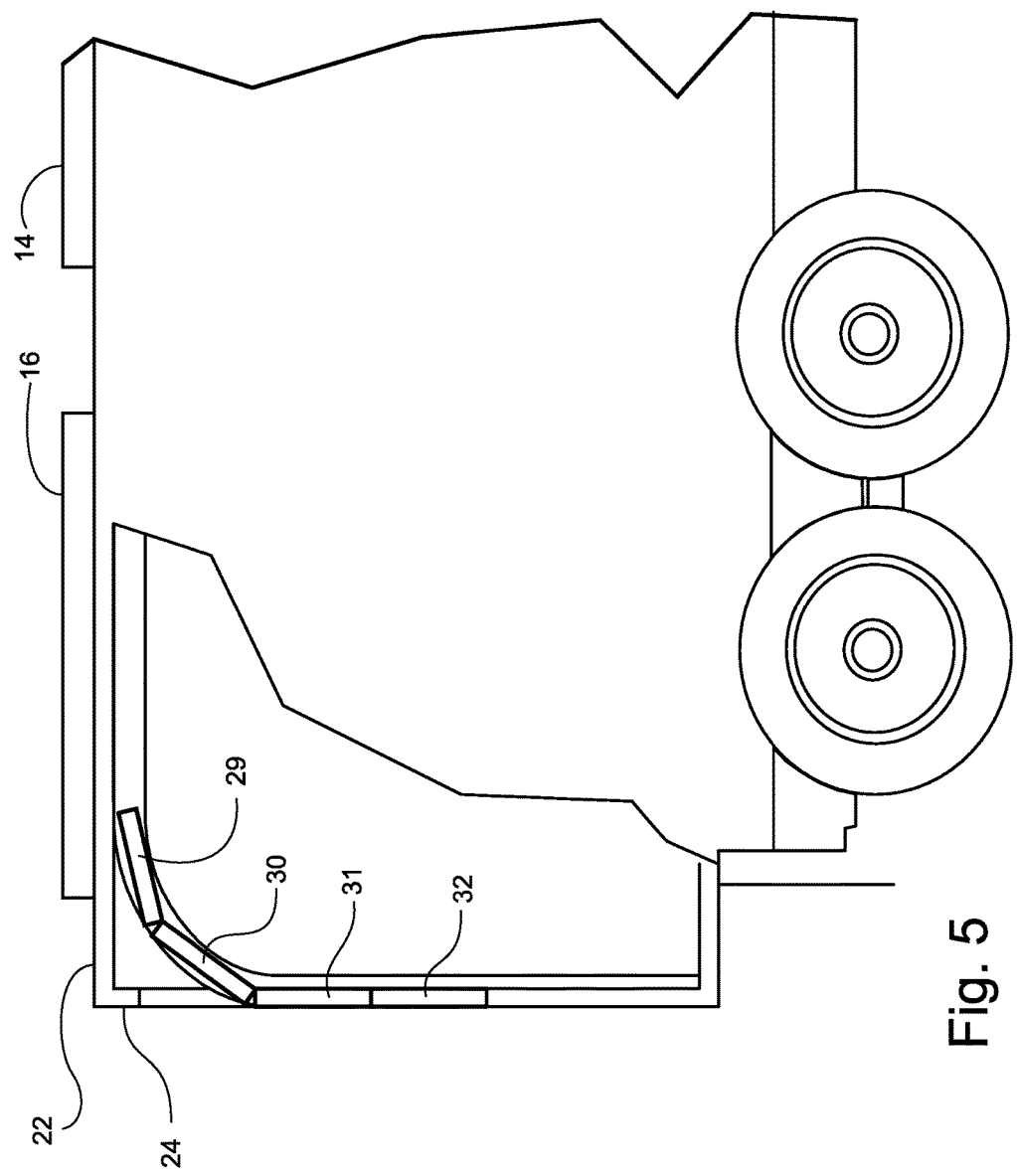
FIG. 5 is a side view of a vehicle, as found in the embodiment depicted in FIG. 3 with a side portion of the vehicle being cut-away, illustrating the roll-up door partially open.

In one embodiment as seen in FIG. 3, a video display 28 can be attached to roll-up door 26 positioned on the back 24 of the trailer. The video display 28 can comprise plurality of panels. In FIG. 4, for illustrative purposes only and not to be considered limiting, the video display 28 is comprised of four panels: 29, 30, 31, and 32. The video display panels 29, 30, 31, and 32 correspond to the paneled construction of the roll-up door 26. When the segmented, paneled roll-up door is lifted into the open position, the paneled construction of the video display 28 allows the display to mirror the operation of the roll-up door, as illustrated in FIG. 5. FIG. 5 is a side view of a trailer as found in FIG. 3 with a portion of the trailer cut away. The video display panels 29, 30, 31, and 32 can roll-up in the same manner of operation as the roll-up door. The paneled, segmented construction of both the video display 28 and the rollup door 26 allow the transition from a closed position (a substantially flat position) to a curved position (during the act of opening and closing as seen in FIG. 5) to an open position (a substantially flat position).

Some video displays may be quite sensitive to jarring movements, such as those experienced while driving. Without protection, some video display screens may quickly break due to the potential bumping and jarring as a vehicle travels on a roadway. In some embodiments, in order to prevent damage to a video display, a screen may be positioned in a housing comprising a protective case. The housing may reduce the level of jarring or shocking by the vibrations of the vehicle traveling on a roadway. In some embodiments, the housing can comprise shock absorbent material where the shock absorbent material decreases the forces acting upon the video display during the operation of the vehicle. In one embodiment, a video display can be mounted such that it "floats" within a protective case and is not jarred by road movement. Enclosing a video display in a protective case can also provide protection of the video display from scratches, vandalism, or the weather. In some embodiments, the protective case can be made from a sturdy plastic that is transparent, resistant to scratches, and can be easily cleaned.

Plastics that can be used include but are not limited to polymers such as acrylics, various laminates, polypropylenes, polyethylenes, methacrylic polymers, polycarbonates, polystyrenes, cyclic olefinic polymers, fluoropolymers, polyesters, polyarylates, polysulfides, polysulfones, other sulfur containing polymers, polymethylpentene polymers, polyolefins polymerized with a metallocene catalyst, polyolefins, allylester polymers, polyamideimid polymers, fullerene polymers, propylene-ethylene copolymers, other copolymers, and other transparent polymers or combinations thereof.

The video display and other components can be powered by one or more of several power sources, such as solar power, rechargeable batteries, or wind power. Where the video display is affixed to the vehicle, a video display may be powered by rechargeable batteries that are recharged by the engine of the vehicle, by solar power, or wind power. It is desirable to provide an alternative power source for a video display so that the screen does not diminish either the fuel or battery of the vehicle on which it is mounted. In an embodiment, the power can be collected by a power generating source, such as solar panels or wind turbines and then stored in rechargeable batteries or a generator for use by a video display, controller, and other devices. When affixed to a vehicle, an alternate source power arrangement is also desirable so that the video display may continue to operate even when the vehicle is stopped or not turned on. In such embodiments, a video display may continue to display information even after the vehicle has stopped. For example, a video display may continue to display images or news after the vehicle has stopped to refuel or stopped for the driver to rest. A power source for the system may be mounted on the top of a vehicle, along the front side of a trailer of a tractor-trailer truck, or other suitable positions.

In order to display advertisements or information, a video display may be connected to a wireless data transfer device via a controller to receive data transmissions for display on the screen. Information received by the controller may be relayed to the video display and displayed on the side or back of a vehicle. In a further embodiment, a wireless receiver device may be positioned on the top of a vehicle to receive transmissions from a plurality of transmission sources. Such transmission sources may include Bluetooth® technology, wireless transmitters, satellite transmitters, WiFi, internet, or intranet. Data signals may be transmitted from such devices to a transmitter located on a vehicle and further transmitted from a control box to a video display screen for display.

In some embodiments a vehicle may be equipped with a position locator device, such as a GPS device, to transmit the position or location of a vehicle to a wireless or satellite receiving device. The positional information of a vehicle can then be used to direct information that is specific for, relevant to, and/or desired for the location of a vehicle.

In other embodiments, advertising information regarding specific products can be transmitted to a wireless receiver for display on a video display screen. Such advertising information may be targeted or changed depending on the location of the vehicle, screen, or billboard. Because the information is transmitted wirelessly, it can be updated in real time or changed at pre-determined intervals of time or distance.

In an embodiment, the information relayed to a wireless receiver may include important news or traffic information that is relevant to the position of a vehicle. Such information may include traffic reports, accident reports, or traffic delays. Other information may include breaking news stories or public service announcements, such as AMBER alerts.

In a further embodiment, the information on the display screen affixed to a vehicle may change due to the transmission of a signal from a operational sensor device connected to vehicle. The operational sensor device can detect signals or information from a plurality of vehicle operation indicators, such as, but not to be considered limiting, application of the brakes, the application of the accelerator, blinkers, direction-indicator lamps, change of bearing, and other like indicators. For example, but not to be considered limiting, when the vehicle is braking, the operational sensor device would transmit a signal to the controller to interrupt the current video display information with a second message. In one embodiment, upon the application of the brakes, an interrupting message notifies on-lookers or motorists that the brakes of the vehicle have been applied. The message may be a fixed or flashing video display. The controller can receive the information or signal and process the information or signal to determine the information or message to display on the video display. In some embodiments, when the vehicle is fully stopped, the controller can send a signal to the video display to display the product advertisement instead of the interrupting message.

Figure 6A:
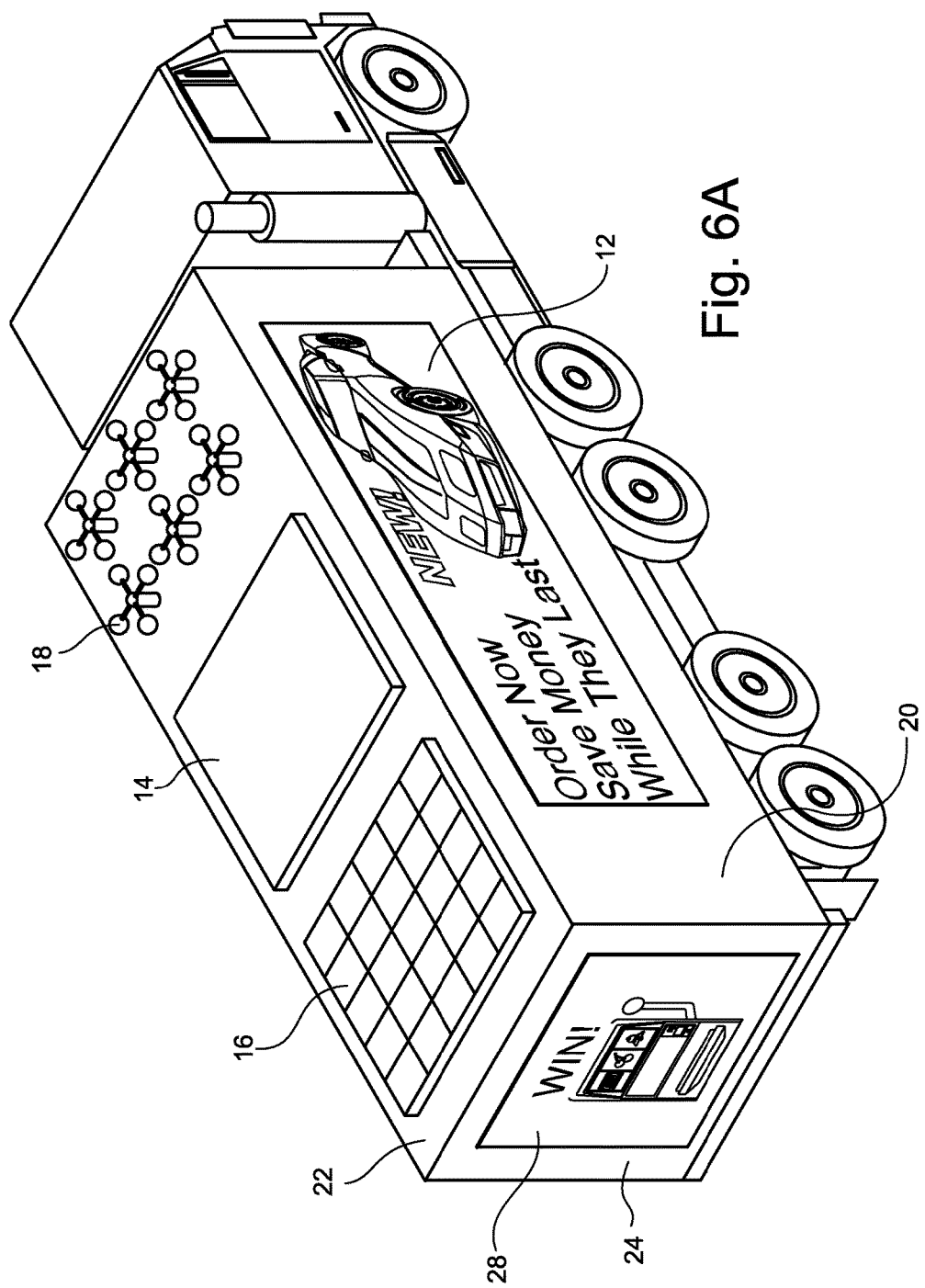
FIG. 6a is a side, rear perspective view of a vehicle fitted with a plurality of video displays in an embodiment of the present invention.
Figure 6B:
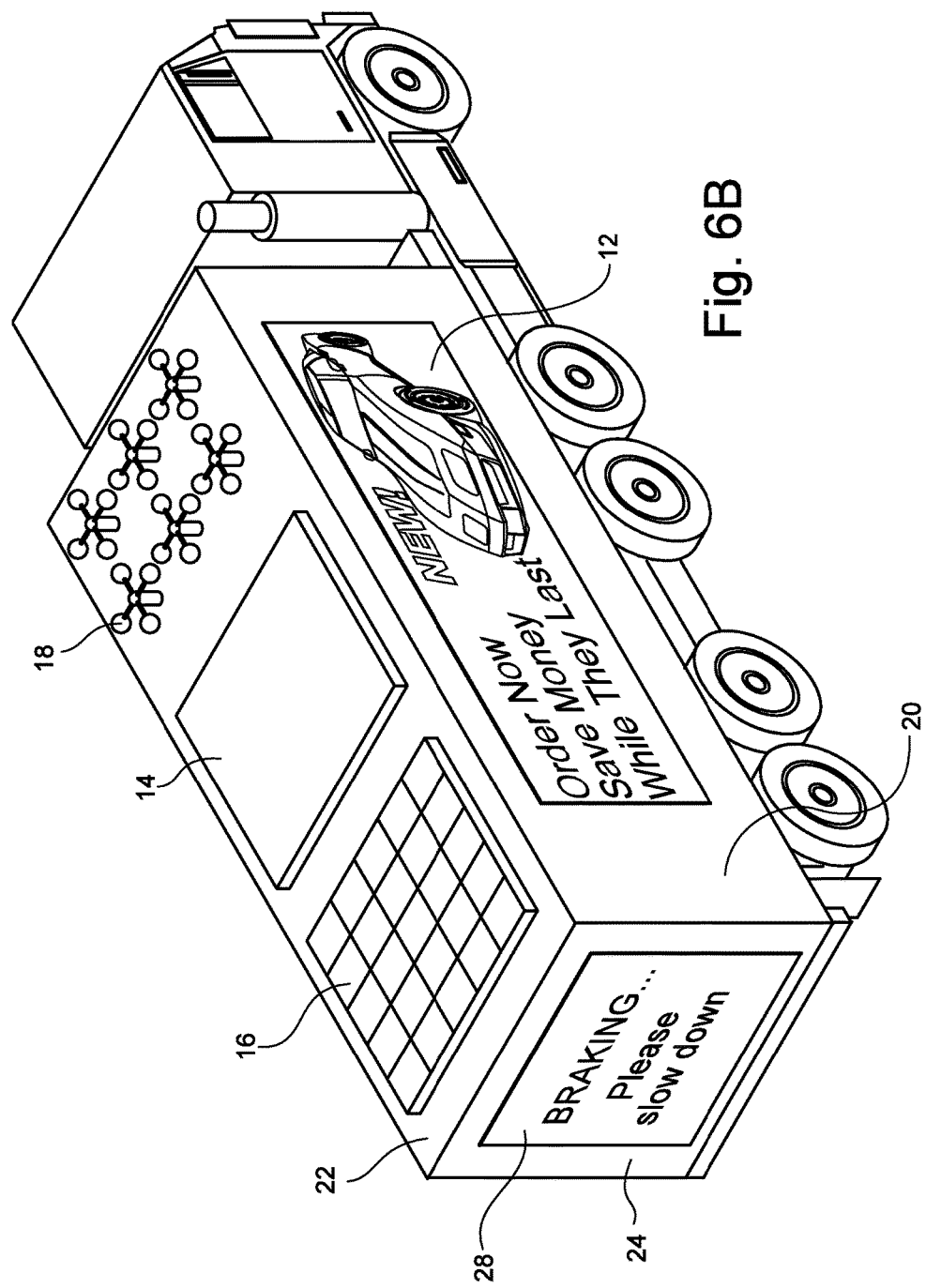
FIG. 6b is a side, rear perspective view of a vehicle fitted with a plurality of video displays with different displayed information according to an embodiment of the present invention.

FIGS. 6a and 6b illustrate an exemplary embodiment where the video display has changed as a result of the application of the brakes. FIG. 6a depicts a vehicle that does not have the brakes applied. FIG. 6b depicts a vehicle of FIG. 6a after the brakes have been applied as found in video display 24. In some embodiments, the video display 12 may also display the interrupting message resulting from the operational sensor device.

The operational sensor device can provide valuable information to enhance the safety of the on-lookers. For example, the intermittent brake signal notifies drivers of the slowing of a vehicle. In some embodiments, the time between the application of the brakes and the displaying of the message on the back of the vehicle less than 2 microseconds. While an on-looker may be focused on the content being displayed on the video display, the on-looker will not be able to dismiss or ignore a interrupting message notifying him or her of an operation change of the vehicle. For example and not to be considered limiting, an on-looker would be unable to dismiss a the message "BRAKING . . . Please slow down" that appears in a large type size and in some embodiments, flashing. The operational sensor device may transmit a signal via a circuit device used within the art.

In another embodiment, a display screen with a retractable static advertisement or informational display may be affixed to the vehicle. The display may be retracted upon the triggering of a sensor by a specified stimulus. After detecting the specified stimulus, the sensor triggers a retractor device to retract the static advertisement. In one embodiment, the sensor can be a light sensor. When the static display image is in the retracted position, a blank screen is present. The blank screen may then be used as a surface to display a video image of different advertisements or information. The different advertisements or information may be displayed by at least one projector, LCD screen, or like screen. The at least one projector, which may be positioned either at the side or rear, can be triggered by a sensor to project the advertisement or information on the blank screen.

Figure 7:
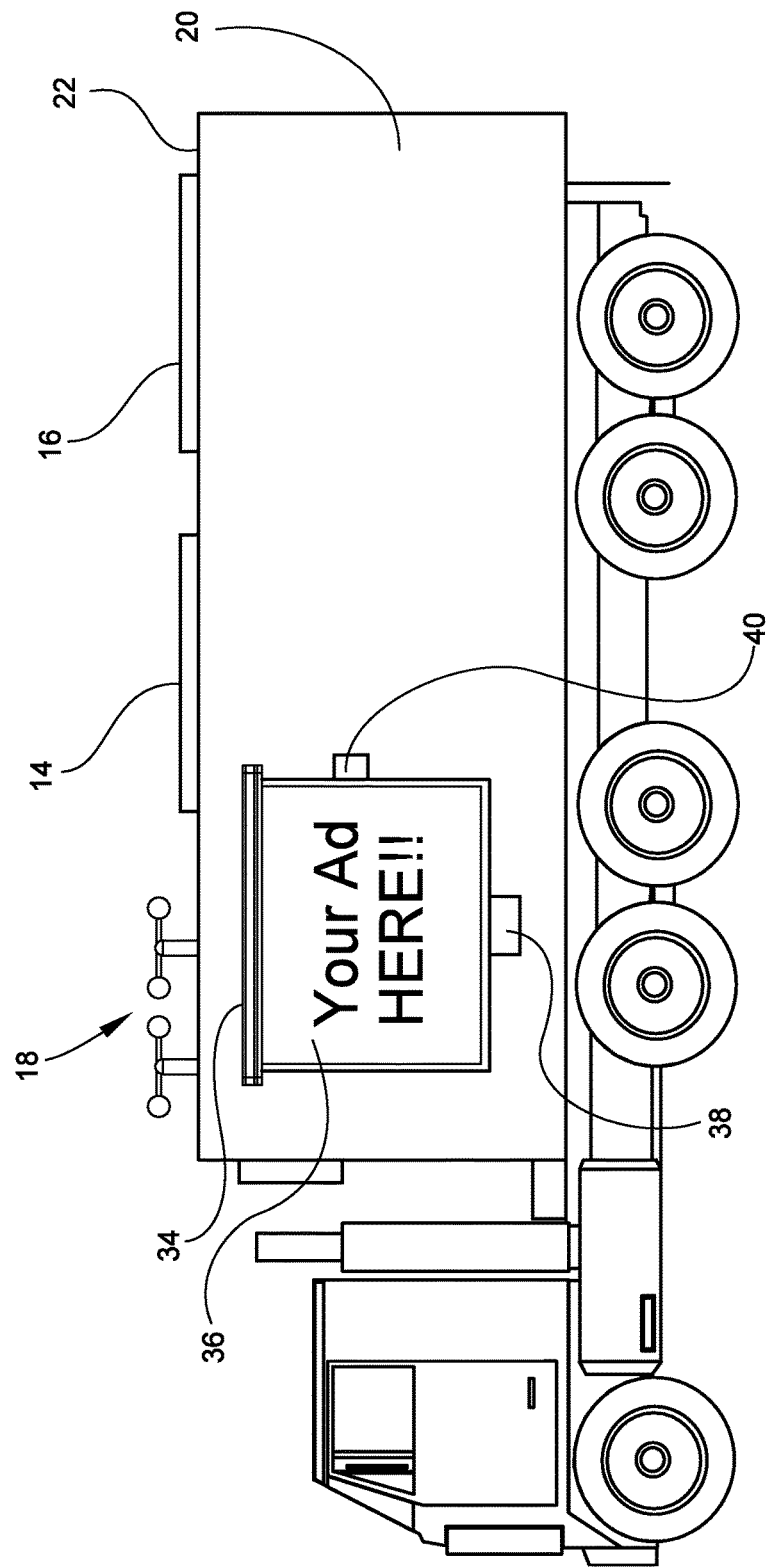
FIG. 7 is side view of a vehicle fitted with a video display of an embodiment of the present invention.

FIG. 7 illustrates one embodiment of the present invention. The representative screen 36 is shown as a projector 38 and 40. Other types of screens may also be utilized, including LED, LCD plasma, rear projection, optical fibers, and the like. The screen may vary depending on the size of the vehicle, and/or the screen may comprise individual panels arranged to produce a large display. The display can be powered by one or more of several power sources, such as solar power 16 or wind power 18. The lumination of the at least one projector may be from the side or rear of the screen. The screen is capable of displaying multiple messages in multiple forms. The view indicates the presence of a retractable static advertisement 36. After the triggering of a light sensor, a retractor device 34 retracts the static advertisement 36 leaving a blank screen which is positioned behind a static advertisement 36. When the static advertisement 36 is in the retracted position, a sensor can trigger the at least one projector or LCD to display an image onto the blank screen.

Figure 8:
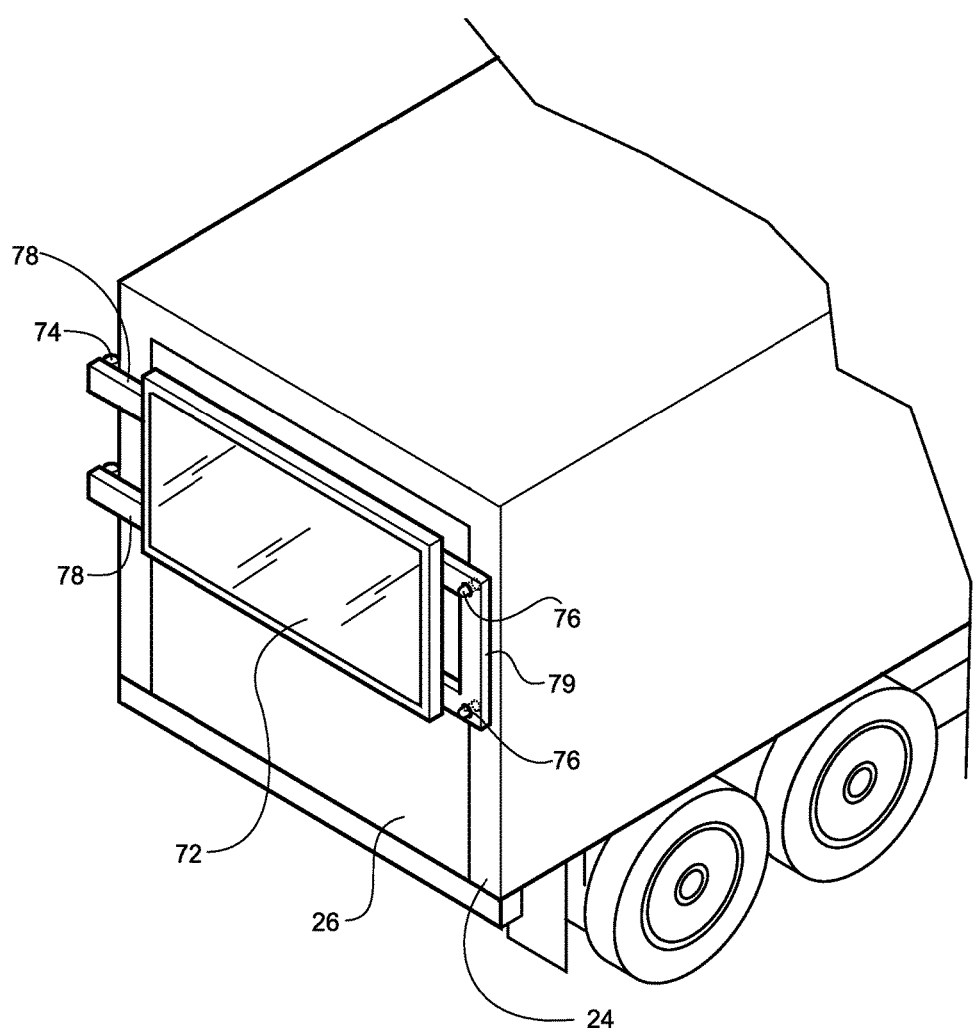
FIG. 8 is a side, rear perspective view of a vehicle fitted with a video display of an embodiment of the present invention.
Figure 9:
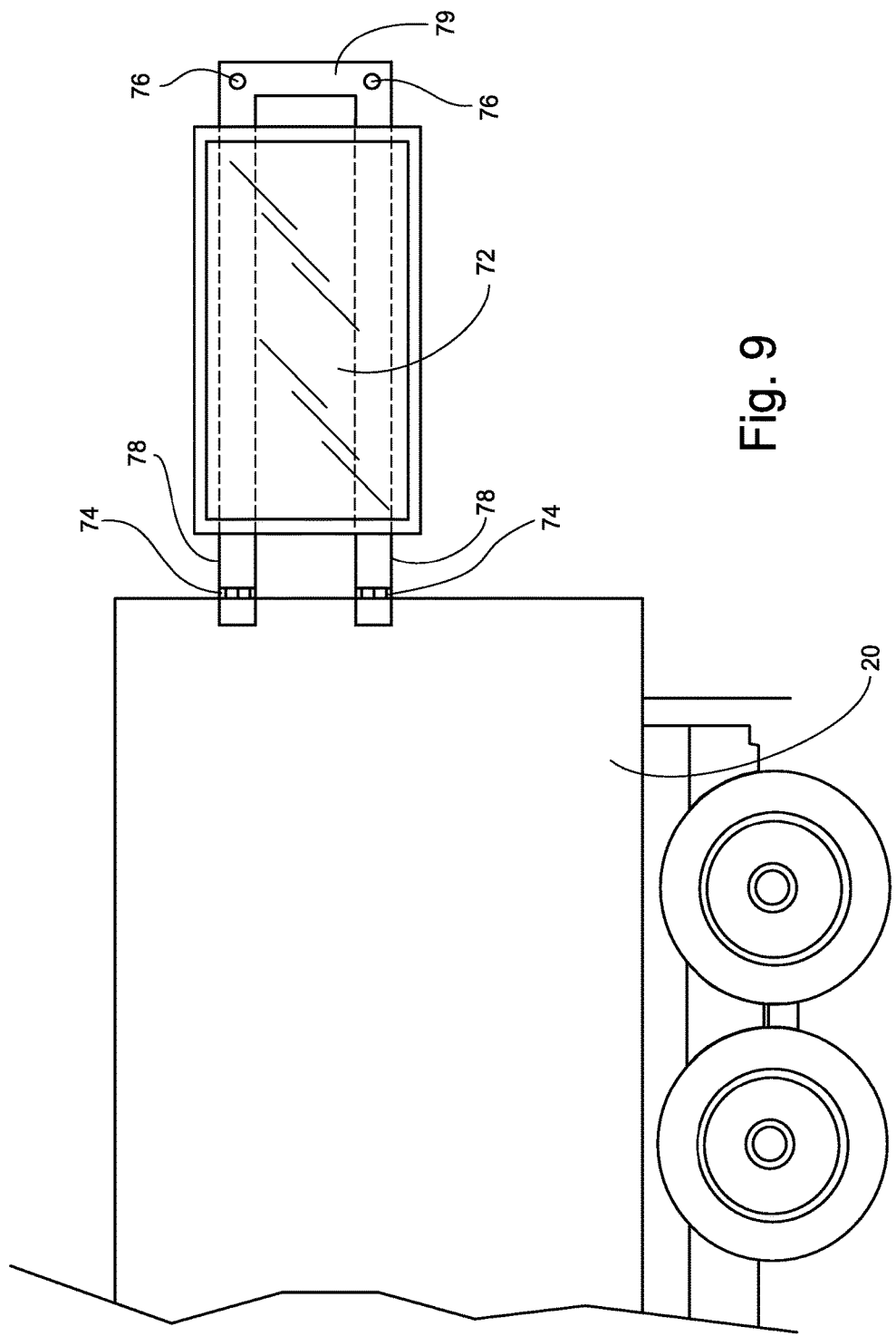
FIG. 9 is a side view of a vehicle fitted with a video display of an embodiment of the present invention.

FIGS. 8-9 depict an embodiment of the present invention where the video display can be attached to the back of a vehicle. Referring to FIG. 8, the video display 72 can be attached a supporting frame comprising horizontal members 78 and vertical member 79. On one end, the horizontal members 78 can be connected to the back 24 of the vehicle by a hinge 74. On the opposite end of the horizontal members 78, attachment devices 76 can be positioned. The attachment devices 76 can provide a mechanism to secure the video display 72 and the horizontal members 78 to the back 24 of the vehicle. In some embodiments, the horizontal member 78 can be connected by a vertical member 79. The vertical support 79 can provide a structure to connect the horizontal members 78. The vertical support 79 can prevent and/or reduce the bending or bowing of the horizontal members 78. Other configurations of the supporting frame can be utilized within the scope of the present invention.

When the attachment devices 79 are engaged, the video display 72 is in the closed position, as found in FIG. 8. When the attachment devices 79 are not engaged, the video display can be swung open into the open position, as found in FIG. 9. In the embodiments depicted in FIGS. 8-9, the hinges are oriented vertically. In some embodiments, the hinges 74 allow the video display to be opened to about a 90° angle from the closed position. In other embodiments, the hinges 74 allow the video display to be opened to about a 110° angle from the closed position. The orientation of the display screen of the video display 72 is substantially perpendicular to the ground.

When the video display 72 is in the open position, the vehicle may be loaded and/or unloaded. The open position allows the unobstructed entry and exit into the vehicle. When the video display 72 is in the closed position, the video display can be available to display a plurality of information.

In some embodiments, an existing vehicle may be retrofitted according to embodiments of the present invention. The video display may be attached to a supporting frame comprising horizontal members and at least one vertical member. The supporting frame may be affixed to the vehicle by hinges and/or attachment devices. The hinges may be positioned to not interfere with the operation of the vehicle's rear door. The supporting frame and the video display, when in the swung out position, allow for an individual to have unobstructed access to the storage compartment of the vehicle.

Figure 10:
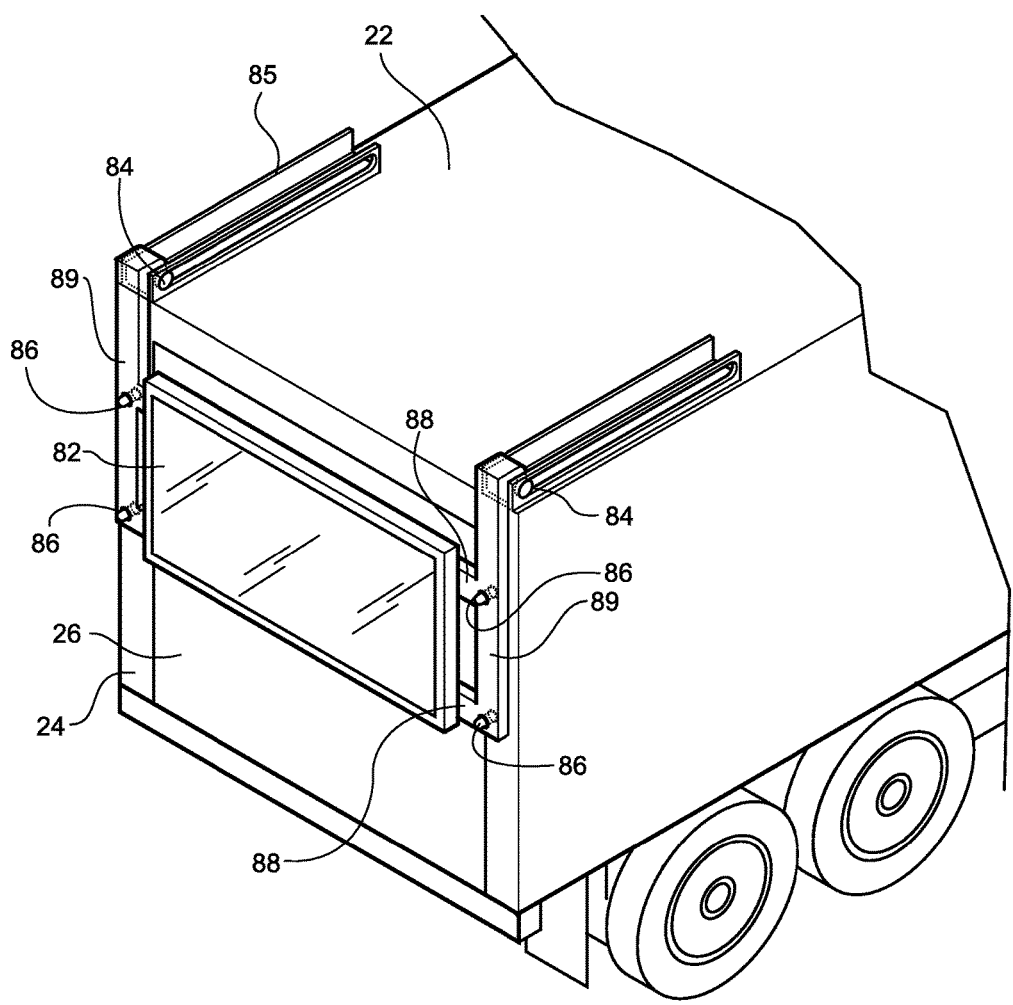
FIG. 10 is a side, rear perspective view of a vehicle fitted with a video display according to an embodiment of the present invention.
Figure 11:
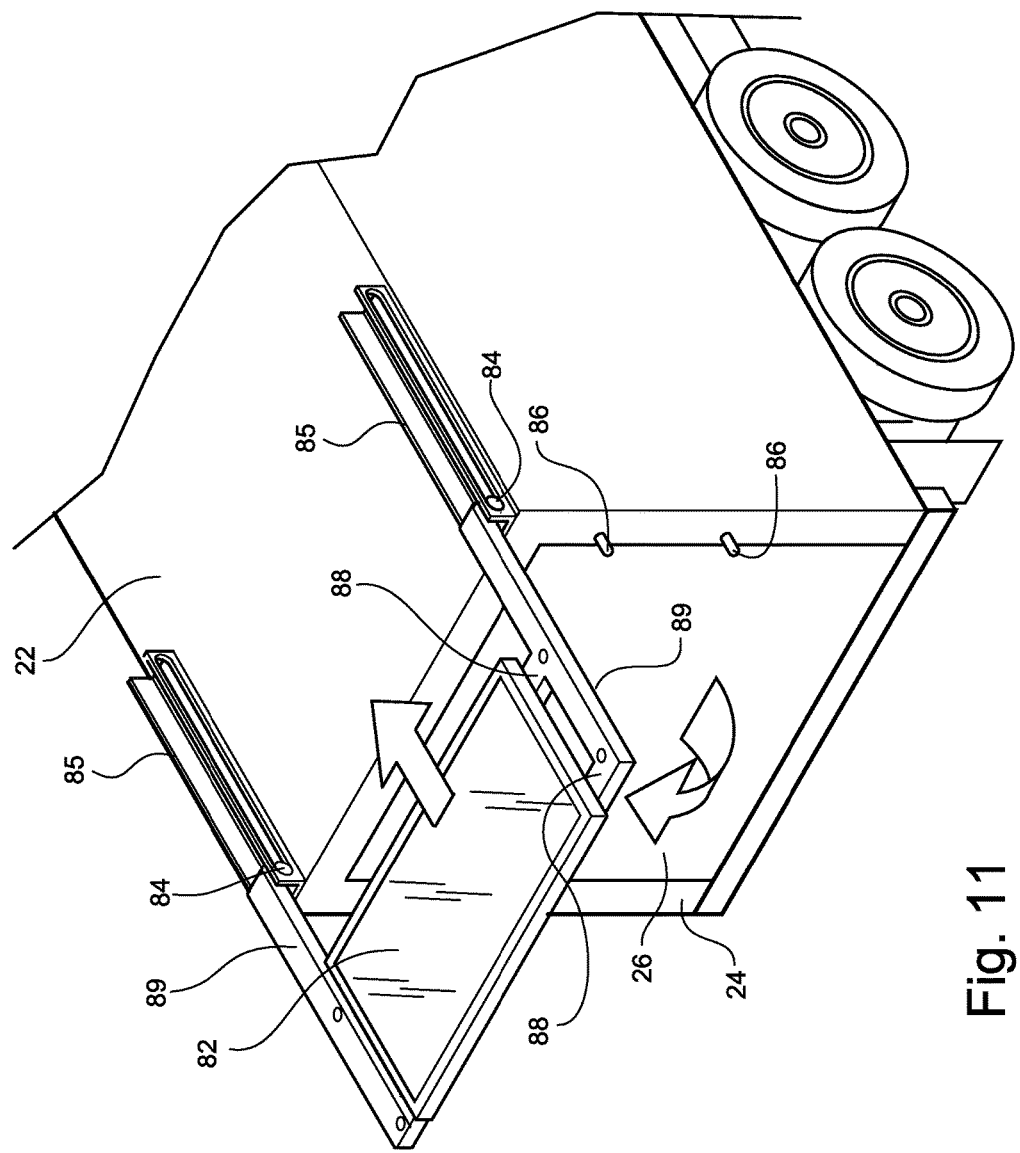
FIG. 11 is a side, rear perspective view of a vehicle fitted with a video display depicting a position of the video display according to an embodiment of the present invention.
Figure 12:
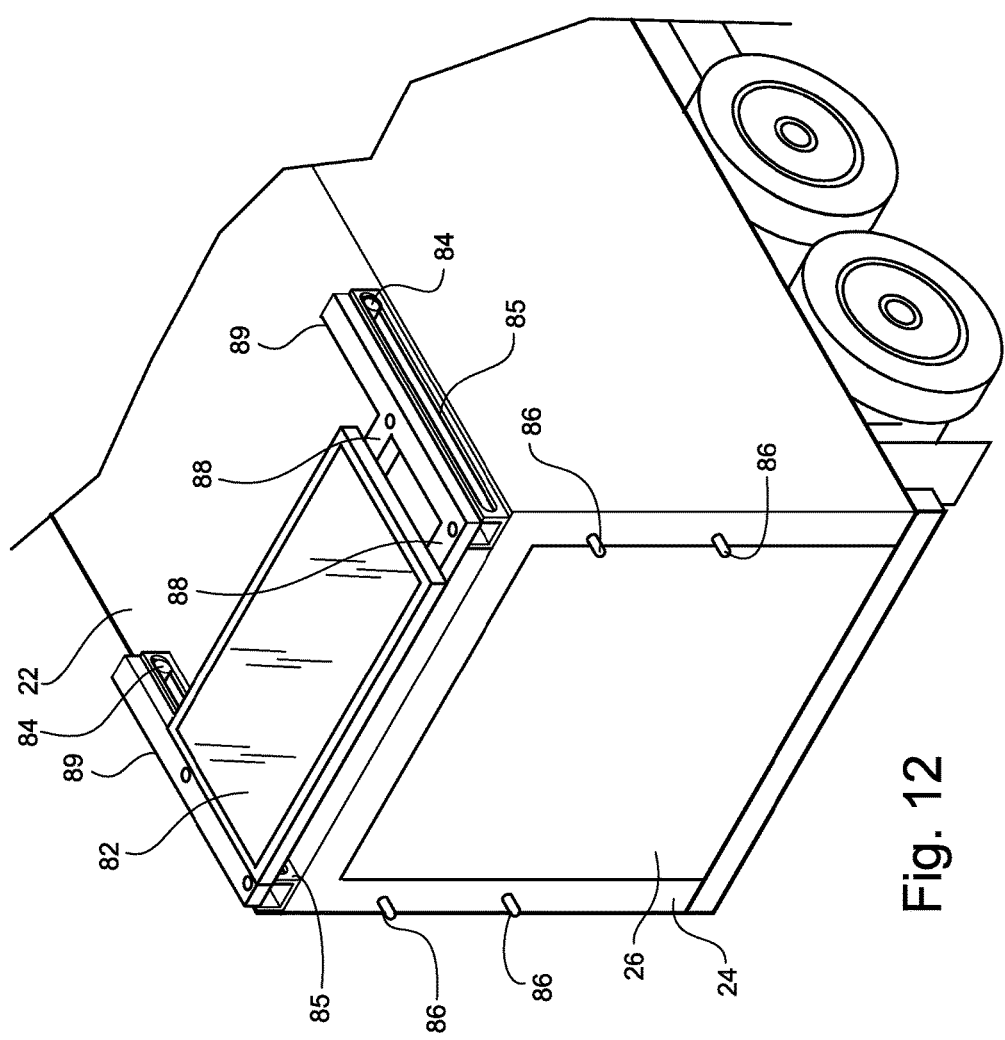
FIG. 12 is a side, rear perspective view of a vehicle fitted with a video display depicting the video display being positioned on top of the vehicle according to an embodiment of the present invention.

FIGS. 10-12 illustrate a embodiment of the present invention where the video display can be positioned on the back of the vehicle. The video display 82 can be attached to a supporting frame comprising horizontal members 88 and vertical members 89. The horizontal members 88 can be connected to vertical members 89. The vertical members 89 can provide stability for the horizontal members 88 to prevent or reduce any bending or bowing. The vertical members 88 can be connected to the vehicle back 24 by hinges 84. In the location where the horizontal members and the vertical support members intersect, attachment devices 86 can be positioned to provide a mechanism to secure the support bars to the back 24 of the vehicle. On the top 22 of the vehicle, track bars 92 can be positioned at a width spacing that is substantially equal to width between vertical support members 89. The track bars 92 can be attached to the top of the vehicle with attachment devices 90. In the embodiments depicted in FIGS. 10-12, the hinges 84 are oriented horizontally.

When the attachment devices 86 are engaged, the video display is in a position so that the video display can be viewed from behind the vehicle. When the attachment devices 86 are not engaged, the video display 82 can be rotated into a position substantially parallel to the ground, as found in FIG. 11. This position can also be described as substantially perpendicular with the back 24, as found in FIG. 11. As depicted in FIG. 11, the video display 84 can be rotated about 90° around the central horizontal axis of the horizontally oriented hinge 84. In the position illustrated in FIG. 11, the video display faces upward.

FIG. 12 depicts a video display 82 of one embodiment in the stored position. In some embodiments, the video display 82 be stored on the top 22 of the vehicle. In some embodiments, the video display 82 and the supporting frame comprising of horizontal members 88 and the vertical members 89 can be repositioned onto the top 22 of the vehicle. In some embodiments, the repositioning may comprise sliding the vertical members 89 of the supporting frame into the track bars 92. The video display 82 in the stored position on the top 22 provides protection from vandals or other individuals from tampering with or vandalizing the video display. The video display 82 can be repositioned and slid by rolling wheels, slide mechanisms, or other like devices.

In some embodiments, an existing vehicle may be retrofitted according to embodiments of the present invention. The video display may be attached to a supporting frame comprising horizontal members and vertical members. The supporting frame may be affixed to the vehicle by hinges and or attachment devices. The hinges may be positioned to not interfere with the operation of the vehicle's rear door. The supporting frame and the video display, when in the swung out position, allow for an individual to have unobstructed access to the storage compartment of the vehicle.

Figure 13:
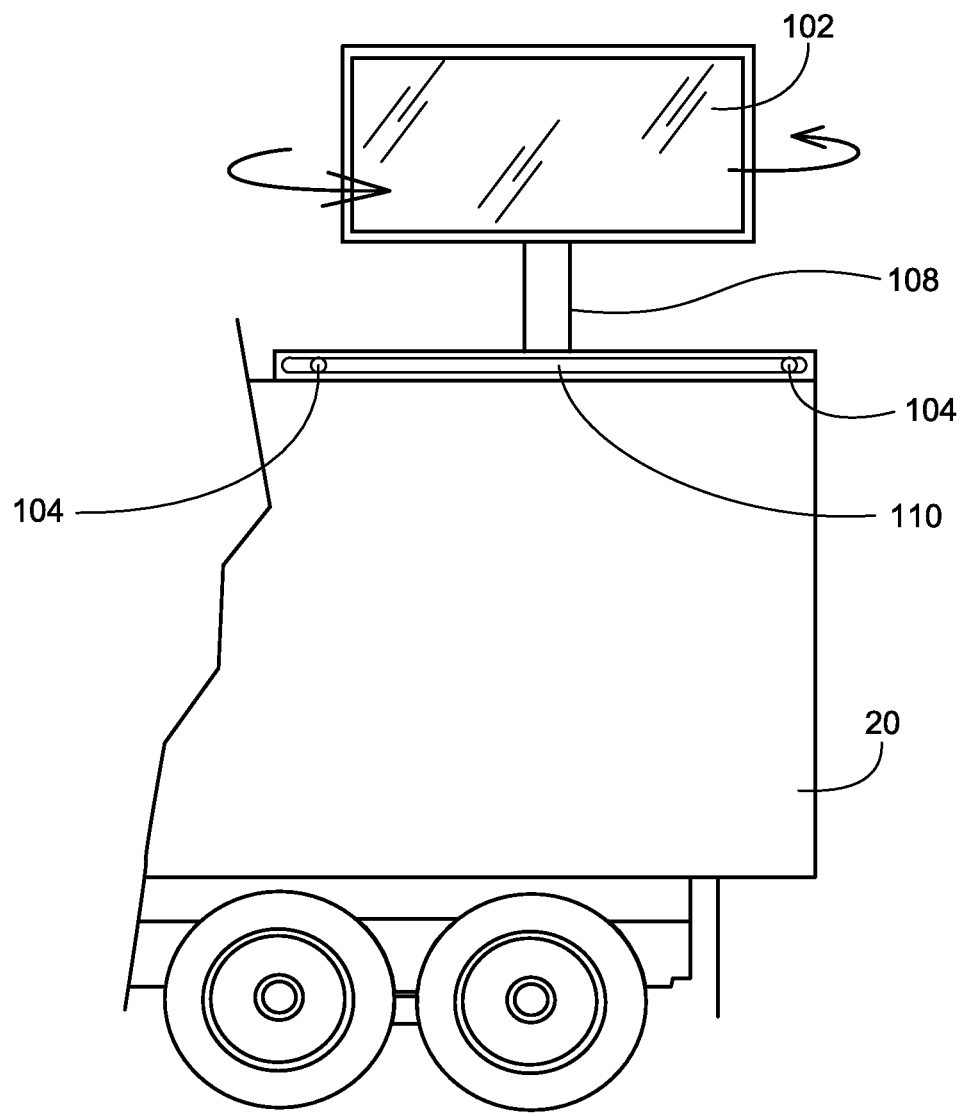
FIG. 13 is a side view of a vehicle fitted with a video display that can be rotated according to an embodiment of the present invention.

In some embodiments, the video display can be positioned on the top of the vehicle. In some embodiments, the display screen portion of a video display can be oriented substantially perpendicular to the top of a vehicle so that the display screen is substantially visible from ground level. In some embodiments, the video display can be rotated 360°. In some embodiments, the video display can be rotated in a range up to about 180°. In other embodiments, the video display can be rotated in a range up to about 135°. In yet other embodiments, the video display can be rotated in a range up to about 90°. Referring to FIG. 13, the video display 102 is positioned on top 22 of the vehicle in an orientation so that the screen is substantially visible from ground level. In some embodiments, a rotating device 108 can be attached to the video display 102. The rotating device 108 can be attached to a frame 110 with attachment devices 104 and 106. The rotating device 108 can rotate the video display 102 clockwise and/or counter-clockwise. In some embodiments, the rotating device 108 can be controlled by a remote control device. In other embodiments, the rotating device 108 can be controlled by a pre-determined interval or program.

In some embodiments, a second support frame positioned on the top of the vehicle or the track bars members on the top of the vehicle may comprise a rotating device. In some embodiments, the second support frame may be positioned on a rotating wheel-like mechanism that provides the rotating motion. The video display and the supporting frame can be reoriented using a hinge or other like device so that the display screen can be visible from the ground level. After the video display is reoriented, the rotating device may rotate the video display so that it can be viewed from a plurality of ground level positions. In some embodiments, the rotating video display can be used when the vehicle is stationary.

In another embodiment, a retractable static advertisement or informational display is affixed to a stationary screen or billboard. The static advertisement or informational display is retracted upon the triggering of a specified stimulus. After detecting the specified stimulus, the sensor triggers a retractor device to retract the static advertisement. When the static display image is in the retracted position, a blank screen is present. The blank screen may then be used as a surface to display a video image of different advertisements or information. The different advertisements or information may be displayed by at least one projector or LCD screen. The at least one projector, which may be positioned either at the front or behind the screen, is triggered by a sensor to project an image on the blank screen.

In one embodiment, the present invention comprises a system comprising a video display attached to a support structure wherein the video display can be positioned in a housing; a retractor device, wherein the retractor device retracts and extends a screen, wherein the screen in the extended position is a static means to display information, and wherein the screen in the retracted position allows the video display to be utilized; a wireless data transfer device wherein the wireless data transfer device comprises a wireless receiver, the wireless receiver being capable of receiving data transmissions; a controller wherein the controller can receive signals from at least one source, the at least one source comprising the wireless data transfer device and wherein the controller transmits signals to video display; at least one light sensor, the at least one light sensor transmits signals to the controller, wherein the controller transmits the signal received from the at least one light sensor to the retractor device; and a plurality of power sources.

Figure 14:
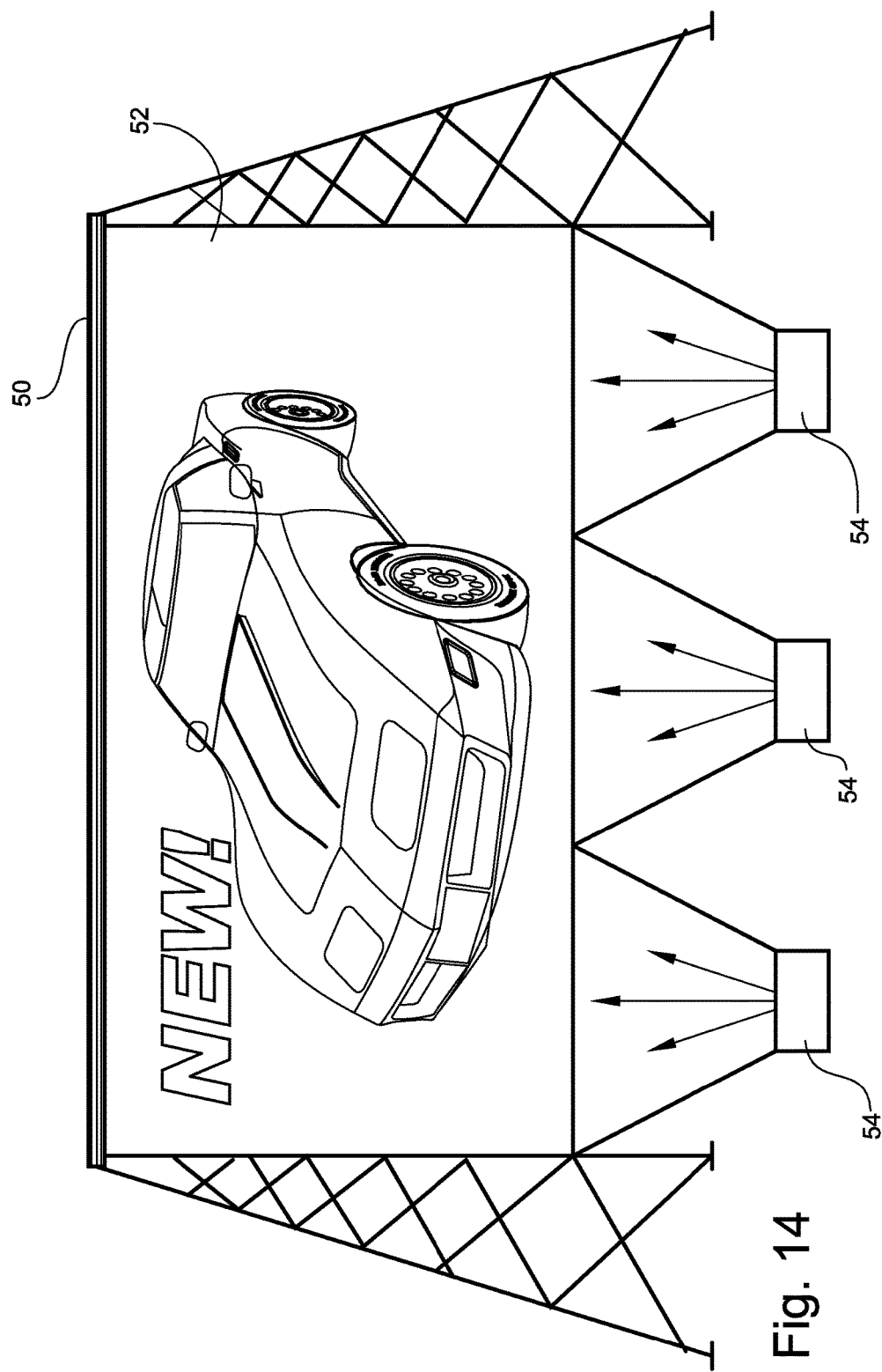
FIG. 14 is a front view of a screen or billboard with a retractable static display of an embodiment of the present invention.

FIG. 14 illustrates one embodiment of the present invention where a billboard can be used. The billboard is capable of displaying multiple messages in multiple forms. The view displays a static advertisement that has been retracted by a retractor device 50. After the triggering of a light sensor, a retractor device 50 can retract the static advertisement leaving a blank screen. The view illustrates that when the static advertisement is in the retracted position, a sensor can trigger the at least one projector 54 to display an image 52 onto the blank screen. As found in FIG. 14, the projectors 54 are displaying the advertisement onto the billboard, as indicated by the arrows emitted from the projectors 54. The view of FIG. 15 indicates a possible placement of the projectors 54 in the front of the screen. In some embodiments, the at least one projector may also be position behind the screen.

In another embodiment, the present invention provides a method for displaying a plurality of information comprising: transmitting positioning information of a video display system; receiving signals or data from a wireless data transmitter by a controller; receiving signals or data from a operational sensor device by the controller; processing received signals and data by the controller wherein processing the received signals and data comprises transforming the signal and ranking a priority of the signal; selecting information to display on the video display wherein the selection is performed by the controller; outputting the selected information to the video display; and displaying the selected information on the video display.

Figure 15:
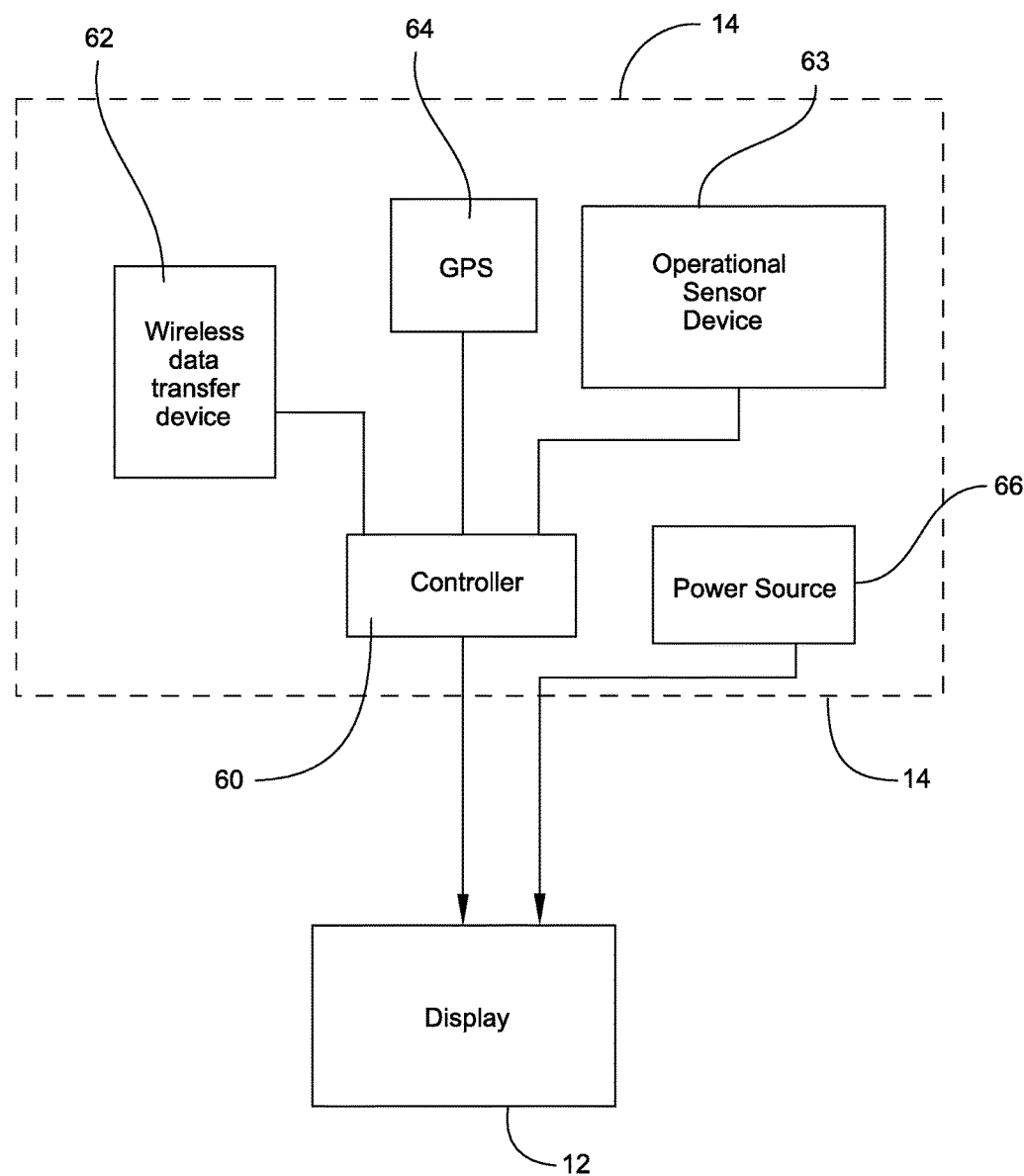
FIG. 15 is a schematic block diagram of the system of an embodiment of the present invention.

FIG. 15 illustrates a schematic of a method according to an embodiment of the present invention. In an exemplary embodiment, FIG. 15 depicts a control box 14 which includes a wireless data transfer device 62, a GPS device 64, an operational sensor device 63, a controller 60, and a power source 66. The wireless data transfer device 62, GPS device 64, and operational sensor device 63 send signals and data to the controller 60. The controller 60 can process the received signals, transform the signals, generate a ranking of the signals, and output a signal to the video display 12 to display an advertisement or other type of information. The video display 12 can also be connected to the power source 66.

It is contemplated and considered to be within the scope of the instant invention that any feature of the present invention can be combined together with any other or combination of features. The instant invention is directed to systems comprising video display screens that can be mounted onto vehicles, screens, or billboards and display advertisements or information in real time. Thus, it should be apparent to those of skill in the art that the instant invention not be limited by the exemplary embodiments and include any combination of the embodiments.

That which is claim is:

1. A vehicular video display system comprising:
   a vehicle;
   a video display attached to the vehicle;
   a source of advertisements unrelated to the operation of the vehicle for display upon the video display;
   an operational sensor device wherein the operational sensor device detects application of the vehicle brakes with said operational sensor device producing a vehicle operation change signal when said operational sensor device detects application of the vehicle brakes;
   a controller connected to said video display and said advertisements to control the display of said advertisements upon said video display, and said controller connected to said operational sensor device to receive said vehicle operation change signal which causes said controller to cease the display of advertisements upon the video display so long as the vehicle brakes are applied and to transmit a message signal to said video display which produces a video message on the video display indicating the vehicle brakes have been applied so long as the vehicle brakes are applied; and
   a power source for providing power to said video display and said controller.

2. The vehicular video display system of claim 1 wherein said controller will cease the display of advertisements upon said video display and cause said video message to be displayed upon said video display in the event that said operational sensor device detects that the vehicle brakes have been applied.

3. A method of displaying advertisements and vehicle operation upon a vehicle display comprising the steps of:
   providing a vehicle with brakes, a video display attached to the vehicle, a source of advertisements unrelated to the operation of the vehicle for display upon the video display, an operational sensor device which detects the application of vehicle brakes, and a controller connected to said video display, source of advertisements, and operational sensor, wherein the operational sensor device produces a vehicle operation change signal when the operational sensor device detects application of the vehicle brakes, and the controller is connected to the video display and the source of advertisements so as to control the display of the advertisements upon the video display, and the controller is connected to the operational sensor device to receive the vehicle operation change signal with the controller operative to transmit a message signal to the video display which produces a video message on the video display indicating the vehicle brakes have been applied when the controller receives a vehicle operation change signal;
   producing advertisements on the video display as controlled by the controller;
   applying the vehicle brakes which causes the operational sensor to produce the vehicle operation change signal which is transmitted to the controller, which in turn causes the controller to cease the display of advertisements upon the video display so long as the vehicle brakes are applied and causes the controller to transmit the message signal to the video display which produces the video message upon the video display indicating that brakes are being applied so long as the vehicle brakes are applied.

* * * * *